United States Patent [19]

Davis

[11] 4,374,404

[45] Feb. 15, 1983

[54] NON-ABRASIVE MAGNETIC HEAD CLEANING SYSTEM

[75] Inventor: C. Paul Davis, Woodland Hills, Calif.

[73] Assignee: Innovative Computer Products Corp., Tarzana, Calif.

[21] Appl. No.: 180,963

[22] Filed: Aug. 25, 1980

[51] Int. Cl.³ .................... G11B 5/41; G11B 23/02; G11B 25/04
[52] U.S. Cl. .................................. 360/128; 360/99; 360/133
[58] Field of Search ............. 360/128, 133, 99, 137, 360/135; 15/210 R

[56] References Cited

U.S. PATENT DOCUMENTS

| 4,065,798 | 12/1977 | Sugisaki | 360/128 |
| 4,106,067 | 8/1978 | Masuyama et al. | 360/128 |
| 4,180,840 | 12/1979 | Allan | 360/128 |
| 4,291,353 | 9/1981 | Fletcher et al. | 360/128 |

FOREIGN PATENT DOCUMENTS

| 2301533 | 8/1974 | Fed. Rep. of Germany | 360/128 |
| 2045508 | 10/1980 | United Kingdom | 360/128 |

OTHER PUBLICATIONS

IBM Tech. Disc. Bull., E. W. Mace, Sound Head Cleaner, vol. 22, No. 2, Jul. 1979, p. 436.

*Primary Examiner*—Alfred H. Eddleman
*Attorney, Agent, or Firm*—Spensley, Horn, Jubas & Lubitz

[57] ABSTRACT

A cleaning system for flexible disk equipment or the like. The system includes a cleaning disk made of an absorbent and porous fibrous material which has an area substantially saturated with a liquid cleaning solution. The cleaning disk is rotatably supported within a flat jacket. The jacket includes opposed openings on either side so as to expose a portion of the cleaning disk to enable the disk to come into contact with a magnetic head or heads. At least one of the openings is enlarged to expose a relatively large portion of the surface of the cleaning disk, so as to facilitate complete saturation of an area of the cleaning disk with a liquid cleaning solution while leaving a portion of the cleaning disk dry. The jacket containing the disk is placed within a flexible disk system which rotates the saturated disk, thus causing the magnetic head(s) to be cleaned in a non-abrasive fashion with a wet, dry, wet action. An improved jacket for use with a thickened cleaning disk is also disclosed.

10 Claims, 9 Drawing Figures

NON-ABRASIVE MAGNETIC HEAD CLEANING SYSTEM

BACKGROUND OF THE INVENTION

1. Field of the Invention

This invention relates to systems for cleaning the magnetic head(s) in flexible disk systems. With flexible disk drives, as with other pieces of data processing equipment, preventive care and periodic maintenance are necessary to insure efficient, smooth and error free operation. Unlike other peripheral devices, the magnetic heads on flexible disk drives are extremely difficult to access without partially disassembling the drive system. Due to this difficulty, head cleaning is generally done only when read/write problems are being experienced.

2. Prior Art

Several systems have been developed in an attempt to provide a convenient means of cleaning the head(s) on flexible disk systems. One such system utilizes two flexible disk jackets. One of the jackets contains an abrasive lapping material, and the other contains a cleaning cloth material. The first jacket is inserted into the flexible disk system and run through the machine for a predetermined amount of time (generally no longer than ten seconds in order to avoid damage to the magnetic head from the abrasive material) so as to loosen debris from the head. The second jacket is then run through the machine so as to pick up the loosened debris. The flexible disk jackets which are used contain standard size openings (i.e. thin radial slots) in order to allow the heads and pressure pad to contact the cleaning material.

A second system, described in IBM Technical Disclosure Bulletin Vol. 20, No. 8, January 1978, utilizes a standard flexible disk jacket and substitutes an abrasive disk for the normal magnetic disk. The abrasive disk is coated with either chromic oxide ($CR_2O_3$ having a diameter of less than 0.7 microns or aluminum oxide ($Al_2O_3$ of the same diameter. The assembly is used to initially lap the magnetic heads of flexible disk drives and subsequently remove contaminant build-up on the head(s).

A third system for cleaning magnetic heads is diclosed in U.S. Pat. No. 4,065,798 issued to Sugisaki et al., on Dec. 27, 1977. This system includes a laminated disk which has a flexible non-magnetic support (e.g., polyvinyl chloride) coated with a magnetic layer on one side and a fibrous cleaning material on the other side. The cleaning disk is located within a cartridge which contains a lubricating layer facing the magnetic layer of the cleaning disk, and includes a normal radial slit which allows the magnetic head to contact the fibrous cleaning material.

It is therefore an object of this invention to provide a system for cleaning the magnetic head(s) of flexible disk drive machines without the need for any disassembly of the machine.

It is another object of the present invention to provide a head cleaning system which is substantially non-abrasive and will therefore not harm the magnetic heads in any way.

It is another object of the invention to provide a head cleaning system which permits the use of a liquid cleaning solution.

It is a further object of the invention to provide a head cleaning system which may be left engaged in a disk drive machine for long periods of time without damage to the magnetic heads.

SUMMARY OF THE INVENTION

These and other objects are achieved by providing a head cleaning system which includes a cleaning disk made of an absorbent lint free and porous material which has an area substantially saturated with a liquid cleaning solution and a dry area. The cleaning disk is rotatably supported within a jacket that includes opposed radial openings on its upper and lower surfaces for exposing the cleaning disk to the magnetic head of a flexible disk system (or both magnetic heads if the drive system is equipped for dual sided flexible disks). At least one of the openings exposes enough of the surface of the cleaning disk so as to facilitate saturation of approximately ⅛ to ½ of the cleaning disk area with the cleaning solution without requiring removal of the disk from the jacket. As the disk rotates a wet/dry/wet/dry surface is presented to the head(s) which provides an effective non-abrasive cleaning. Also, the formulation of the solution is such that it evaporates during the predetermined cleaning cycle (generally less than three minutes) insuring that the head(s) are dry and clean. The porous nature of the cleaning disk facilitates the collection of foreign particles.

The saturation opening exists on only one side of the jacket while the other side of the jacket has a perforated oblong section. This perforated section remains intact as to single head disk drives and dual head disk drives where the heads are not in direct opposition to one another. The oblong perforated section is removed to form an opening for cleaning a head when the jacket is employed in dual head disk drives where the heads are in direct opposition to one another. More specifically, the saturation opening in the jacket which exposes the cleaning disk should have a configuration that provides adequate support for the cleaning disk, thereby avoiding any substantial sagging of the cleaning disk which would interfere with the disk drive and hamper removal of the cleaning system. This support should be provided while exposing an adequate area of the cleaning disk for saturation. One means for accomplishing such support is the forming of an opening in the jacket which inherently provides support to the cleaning disk. Such openings in general have at least one major boundary which is more generally chordal as distinguished from radial or concentric. The other major boundary generally tends to be more curvilinear although not necessarily circular.

BRIEF DESCRIPTION OF THE DRAWINGS

In the drawings, wherein like numerals refer to corresponding components in the several Figures.

DETAILED DESCRIPTION OF THE DRAWINGS

Figure 1:
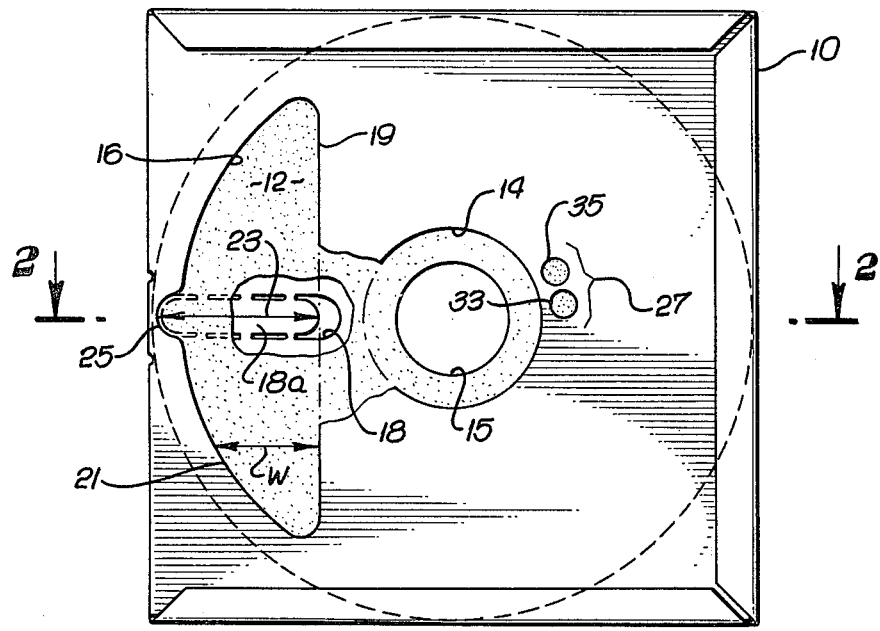
FIG. 1 is a top plan view of the cleaning system of the present invention.

Referring now to FIG. 1, the present invention includes a jacket 10 which rotatably supports a cleaning disk 12. The material used for the jacket 10 may conveniently be the standard vinyl-like material which is utilized for normal magnetic floppy disk jackets. Other materials are also within the scope of the present invention. The cleaning disk 12 is made of a lint-free, absorbent material of a porous nature so that contaminants and debris picked up from the head(s) are trapped and held by the cleaning disk surface. Preferably, the disk 12 is made from a lint free fibrous porous material having a white or other light color so that an operator may easily tell when the disk 12 needs replacement by checking it for discoloration. The cleaning disk 12 should be relatively resistant to wear so that several cleanings can be accomplished with the same disk. Materials which may be used for the cleaning disk 12 include, but are not limited to, spunbonded polyester (e.g., Dupont Reemay) or spunbonded olefin.

Referring further to FIG. 1, the jacket 10 includes a center opening 14 for accommodating a drive shaft of a disk drive system. Similarly, the cleaning disk 12 includes a center opening 15 through which a drive shaft passes. The jacket 10 includes an enlarged opening 16 which exposes a portion of the disk 12 of approximately $\frac{1}{8}-\frac{1}{2}$ of its cleaning area and preferably approximately $\frac{1}{4}$. The opposite side of the jacket 10 contains a perforated thin radial section 18a which is left in place when the invention is used to clean single head drives. If the disk drive has two heads, the perforated radial section 18a is removed, exposing opening 18, so that both heads can be cleaned at the same time. When cleaning single head drives, the perforated radial section 18a is not removed because the solution and cleaning material could damage the pressure pad of certain models of disk drives. It is, of course, possible to devise a pressure pad construction that would not be so damaged.

The openings 16 and 18 serve to expose the surface of the cleaning disk to the magnetic head of a disk drive system, or to two magnetic heads in the case of a dual-sided disk drive system. The enlarged opening 16 is provided to facilitate saturation of a suitable portion of the cleaning disk 12 with a cleaning fluid in one application without requiring the removal of the cleaning disk 12 from the jacket 10 or rotation of the disk 12. Depending upon the absorbency and wetting action of the material of the cleaning disk 12, the size of the opening 16 may be either smaller or larger than the size shown. Generally, with the aforementioned materials the opening will be sufficient if it exposes approximately one quarter of the surface of the cleaning disk 12. The basic purpose is to permit the application of cleaning fluid through the opening 16 which will then be absorbed by the cleaning disk 12 over the appropriate portion of its surface. If the jacket 10 contained thin radial slots which are typically for magnetic disk jackets (i.e., approximately the size of the opening 18), it would be difficult, if not impossible, to properly saturate the cleaning disk 12 in one application. Rather, a small portion of the disk 12 would have to be saturated and then the disk 12 would have to be rotated so as to expose another unsaturated portion. This process would have to be continued until the appropriate portion of the cleaning disk 12 were saturated with cleaning fluid. When a volatile cleaning solution is employed there is the problem of the solution quickly evaporating before cleaning commences. Since the material used for the disk 12 is absorbent, the size of the opening 16 facilitates quick saturation in one application while still allowing the jacket 10 to support the disk 12.

In addition to the size of the opening 16, it has been determined that the configuration of the opening is also of significance. It is preferred that opening 16 have a configuration such as shown in FIG. 1. The configuration of opening 16 has a generally straight or chordal portion 19 and an adjacent area that provides support for the cleaning disk 12. The portion 19 of opening 16 is connected to a curved portion 21 that is generally separated from the portion 19 by a decreasing dimension or width W. The maximum dimension should be at least large enough to enable the entire head of the disk drive to be cleaned by the cleaning disk. In the preferred embodiment this occurs at the diametrical width 23, which includes a radiused or circular portion 25 continuous with curved portion 21.

Alternate configurations of opening 16 may be employed provided saturation of the disk is facilitated, while the support of the disk and jacket is maintained so as to minimize planar distortions (sagging, etc.) that may interfere with the insertion and removal of the cleaning system. For example, the opening 16 may be generally triangular, elliptical or rectangular. The rectangular configuration involves some disadvantageous compromises which may be tolerated or which may be overcome by the addition of a second saturation opening.

In a single head disk drive the side of the cleaning disk not in contact with the head is completely supported by the pressure pad. In a dual-head disk drive with the heads in direct opposition to one another, the perforated portion 18a is removed and the second head projects through the opening 18 formed by the removal of the perforated portion 18a. This opening may conveniently be the same size and configuration utilized on standard floppy disk jackets. Any other configuration which enables the entire head to be cleaned would also be acceptable.

In certain dual-head disk drives, the heads on opposite sides of the disk are offset with respect to one another, with a pressure pad being located in opposition to each head. In order to clean disk drives with such head arrangements without engagement of the pressure pads, the same jacket may be employed with a thicker cleaning disk, which would enable both of the heads to contact the cleaning disk without the pressure pads engaging the disk. In this manner, cleaning of both heads simultaneously without interference from the pressure pads is facilitated.

Referring further to FIG. 1, a plurality of holes 27 in the jacket are employed to enable the cleaning device of this invention to simulate a magnetic disk and thereby enable the disk drive to be rotated and controlled in the same manner as if a magnetic disk were positioned in the system. The different holes are for different types of disk drives. For example, the hole 33 is employed in a single-sided single-head drive while the hole 35 is employed in double-sided disk drives such as those employing opposed heads. A compatible hole or holes are formed in the cleaning disk. Of course, other hole configurations for use with different types of drives are within the scope of the invention.

Many types of cleaning solutions may be used to saturate the disk 12. For example, a typical isopropyl alcohol or a mixture of isopropyl alcohol and a flourocarbon (e.g., freon) could be utilized. Any solution may be employed that: has solvent properties such that it dissolves common contaminants found on heads, does not leave a residue on the heads, and evaporates during the predetermined cleaning cycle (e.g., less than three minutes). In the preferred embodiment the cleaning solution evaporates in less than 90 seconds when rotated by a commercially available floppy disk drive.

Figure 2:
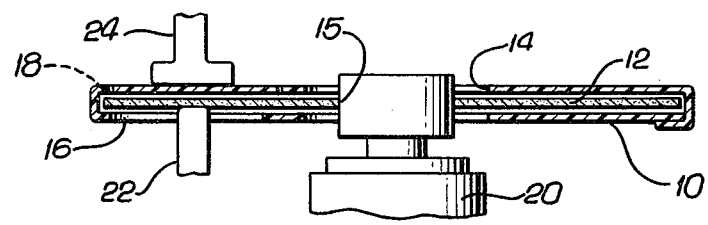
FIG. 2 is a side view, in section, of the cleaning system of the present invention shown in position to clean the magnetic head of a single disk drive system.

Referring now to FIG. 2, the cleaning system is shown in engagement with a single head drive system 20. After a portion of the cleaning disk 12 is saturated with cleaning solution via opening 16 the cleaning system is inserted in drive 20, where a magnetic head 22 contacts one side of the cleaning disk 12 via opening 16 and a pressure pad 24 (schematically shown) applies pressure to the outside of the jacket 10 and therefore the disk 12, but is prevented from contacting the cleaning disk 12. The drive system 20 rotates the cleaning disk 12 and includes a clutch (not shown) which grasps the cleaning disk 12. Debris which has accumulated on the magnetic head 22 is dissolved by the cleaning solution and carried away by the cleaning disk 12. The dry portion of the cleaning disk contacts the head after the wet portion of the cleaning disk contacts the head. This wet-dry cycle facilitates cleaning and drying of the heads. Since the fibrous material of the disk 12 is substantially non-abrasive, the drive system 20 may be left engaged for a long period of time without any damage to the magnetic head 22.

Figure 3:
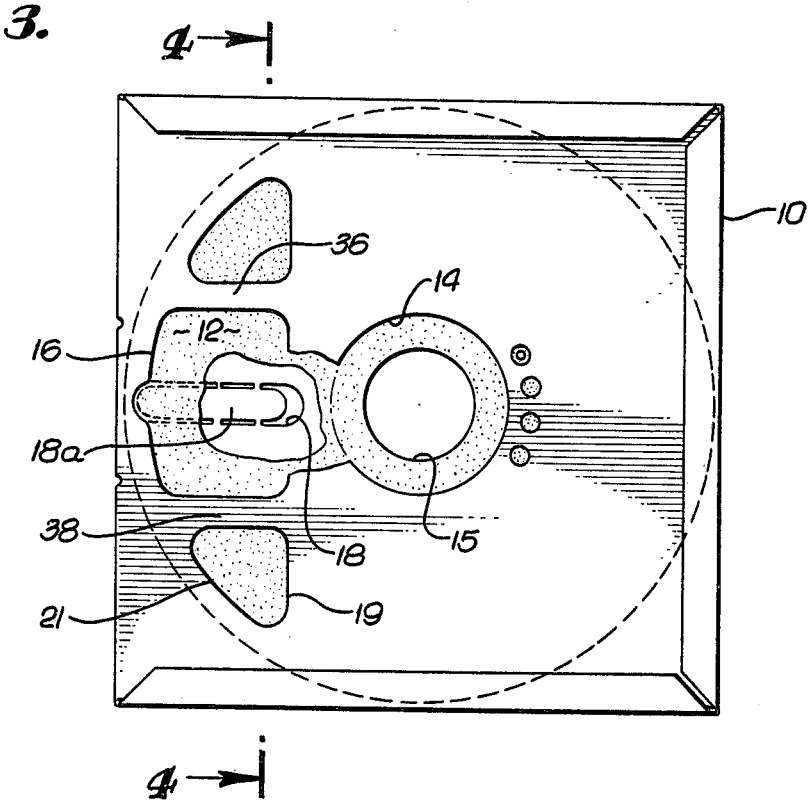
FIG. 3 is a top plan view of an alternate embodiment of the cleaning system of the present invention.
Figure 4:
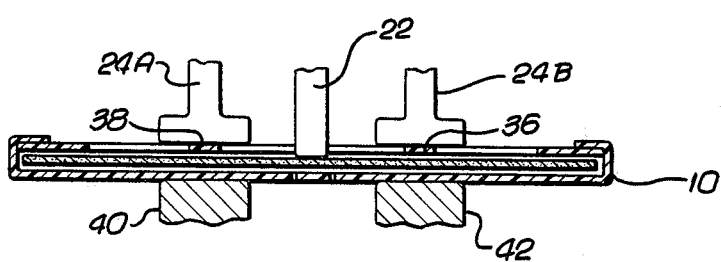
FIG. 4 is a side view section taken along lines 4—4 of FIG. 3.

FIGS. 3 and 4 show an alternate embodiment of the invention. In these figures the same numerals employed in FIGS. 1 and 2 are employed to designate similar parts. The primary difference between the embodiments shown in FIGS. 3 and 4 and that of FIGS. 1 and 2 is the addition of two isolation means in the form of bridge members 36 and 38 which extend across the opening 16 from portion 19 to portion 21. As shown in FIG. 4, when the jacket 10 is inserted into the disk drive, the bridge members 36 and 38 contact a pair of pressure pads 24A and 24B and prevent the pressure pads from contacting the cleaning disk 12. It should be noted that the disk drive employed in FIG. 4 is an arrangement different from that shown or mentioned in connection with FIG. 2. The disk drive of FIG. 4 in addition to employing a pair of pressure pads 24A and 24B utilize a magnetic head 22 located between the pressure pads. On the opposite side of the jacket in an opposed relationship to the pressure pads are structural members 40 and 42 which support the jacket 10 and facilitate operation of the pressure pads 24A and 24B. In this type of disk drive it is common to employ a pair of magnetic heads 22 in direct opposed relationship. In such a disk drive employing two magnetic heads the perforation 18 would be removed and both magnetic heads would be in direct contact with the cleaning disk 12 to enable simultaneous cleaning of both heads. The addition of the bridge members 36 and 38 enables the subject invention to be employed not only in connection with the disk drives as described in connection with FIGS. 1 and 2 but also disk drives such as shown in FIG. 4. The bridge members 36 and 38 permit the cleaning disk 21 to be rotated at approximately the same speed as if a magnetic disk were employed in the jacket 10; thus enabling the floppy disk drive to operate in the same manner in the cleaning mode as it would operate in a magnetic storage mode.

Figure 5:
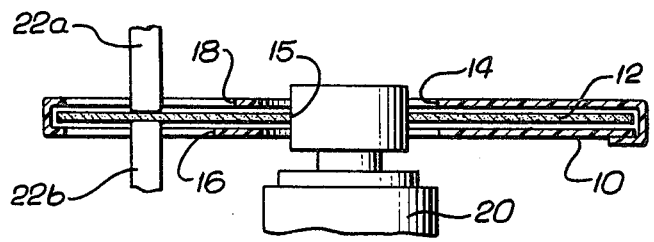
FIG. 5 is a side view, in section, of the cleaning system of the present invention shown in position to clean the magnetic heads of an opposed dual head type drive.
Figure 6:
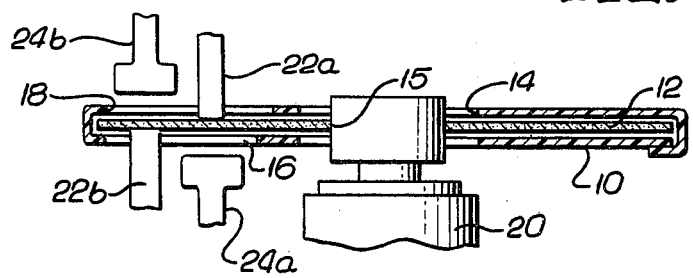
FIG. 6 is a side view, in section, of the cleaning system of the present invention shown in position to clean the magnetic heads of an offset dual head type drive.

FIGS. 5 and 6 illustrate how the cleaning system of the present invention engages drives with dual headed configurations. In the system shown in FIG. 5, the perforated portion 18a has been removed so that two opposing heads 22a and 22b contact opposite sides of the cleaning disk 12 so as to facilitate their simultaneous cleaning. In the system shown in FIG. 6, offset heads 22a and 22b both engage the cleaning disk 12, while the pressure pads 24a and 24b are left disengaged so that they do not retard the motion of the cleaning disk. As stated previously, the use of a thicker cleaning disk enables the heads in an offset arrangement to come into sufficient contact with the disk to achieve proper cleaning action despite the non-engagement of the pressure pads.

Figure 7:
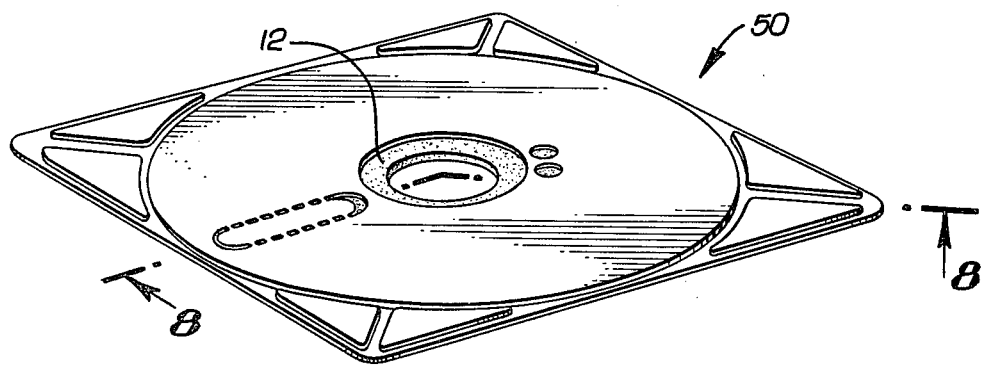
FIG. 7 is a perspective view of an alternate jacket design.
Figure 8:
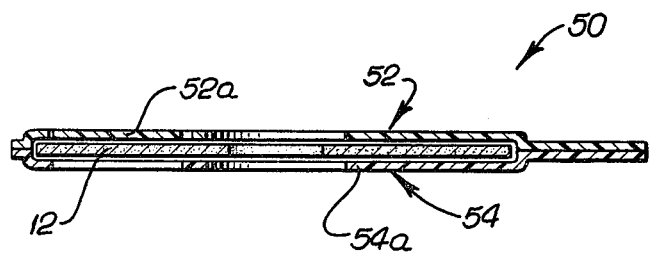
FIG. 8 is a side view, in section, of the jacket of FIG. 7.

Although the use of a relatively thick cleaning disk is advantageous when cleaning disk drives having an offset head arrangement, the extra thickness presents some problems with respect to the jacket. Since a typical floppy disk and cleaning disk are relatively thin, most jackets have previously been made simply by providing two flat sheets of material and securing them together at their edges, such as by folding one edge over another as shown in FIG. 1. When a thick cleaning disk is employed with this type of jacket, pressure from the sides of the jacket results in the cleaning disk having a tendency to drag and stick as it is being rotated. This problem may be overcome by utilizing a modified jacket 50, as is shown in FIGS. 7 and 8. The jacket 40 is formed with two panels or sheets 52 and 54. One or both of the panels includes an embossed section 52a and/or 54a which is slightly larger in diameter than that of the cleaning disk 12. When the panels 52 and 54 are fastened together, the embossments form a cavity within which the cleaning disk 12 is held. The additional space provided by the cavity permits the thick cleaning disk 12 to rotate freely within the jacket 50. The panels 52 and 54 may be sealed by one of a number of different methods, including but not limited to ultrasonic welding, heat sealing and the use of adhesives. It should be noted that the additional thickness of the jacket 50 caused by the embossments will not interfere with the operation of the disk drive system. Furthermore, the embossed jacket 50 is not limited to use with a cleaning disk, but could also be employed with regular magnetic floppy disks.

Figure 9:
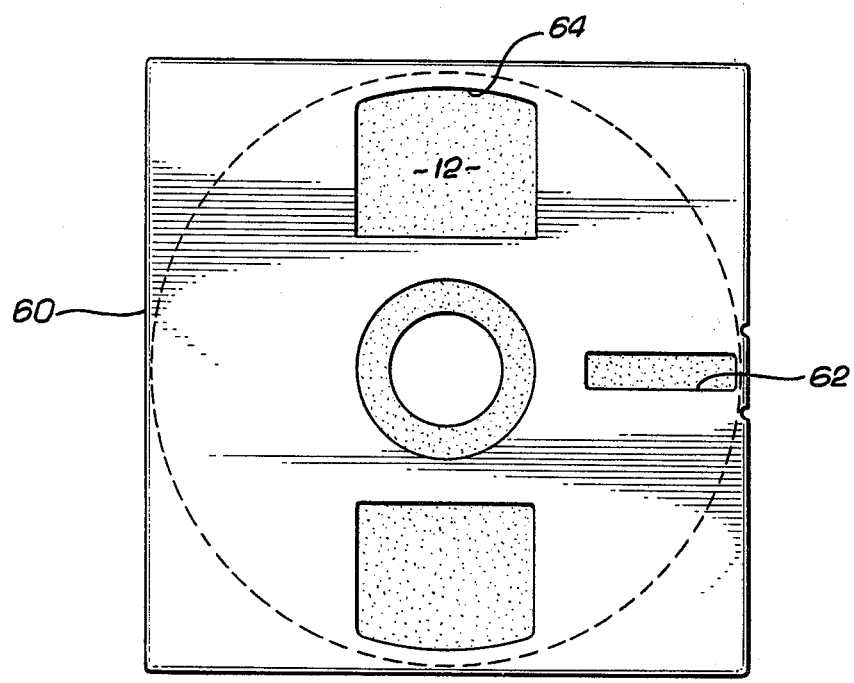
FIG. 9 is a top plan view of a further alternate embodiment of the invention.

Referring to FIG. 9, yet another alternate embodiment of the invention employs a jacket 60 which has standard narrow slit openings 62. In addition, separate openings 64 are included in the top side of the jacket 60 to facilitate saturation of the cleaning disk 12. The openings 62 are such that the disk 12 will have little or no tendency to sag through them. Of course, many variations in the size, number and configuration of openings can be devised. The basic consideration is to provide a jacket which facilitates saturation of the cleaning disk while still providing adequate support for the cleaning disk.

In summary, the present invention provides a system which permits convenient cleaning of the magnetic heads in a magnetic disk drive system. This is facilitated by using a jacket having an enlarged saturation opening and carrying a cleaning disk of fibrous and porous absorbent material. The saturation opening or openings must be of a configuration that enables the disk to be supported so as to minimize planar distortions. A cleaning solution is applied to the cleaning disk through the saturation opening until a portion of the cleaning disk is saturated. The jacket containing the disk is then placed within a disk drive system which is then turned on for a period of time so as to clean the magnetic head(s).

I claim:

1. A method for cleaning magnetic heads in a disk system employing a jacket that rotatably supports a cleaning disk within its interior and has a first opening therein and has a perforated portion in opposition to the opening; the steps comprising:
   removing the perforated portion to form a second opening;
   saturating a portion of said cleaning disk with a cleaning solution via said first opening;
   bringing said cleaning disk into contact with two magnetic heads to be cleaned; and
   rotating said cleaning disk to alternately contact said head with a wet portion and a dry portion of said cleaning disk.

2. The method defined in claim 1 wherein the cleaning solution employed evaporates in less than three minutes when the cleaning disk is rotated.

3. The method defined in claim 1 wherein the material employed for the cleaning disk is an absorbent and porous material, said porous nature of the material enabling foreign particles to be collected by said cleaning disk.

4. The method defined in claim 1 wherein between ⅛ to ½ of the cleaning area of the cleaning disk is saturated with cleaning solution.

5. A device for cleaning a magnetic head in flexible disk systems, comprising:
   a cleaning disk made of an absorbent and porous material, and adapted to be saturated with a liquid cleaning fluid; and
   a substantially flat jacket rotatably supporting said cleaning disk within its interior, said jacket including two sides, a first side having at least one opening for exposing said cleaning disk to a first magnetic head of a flexible disk system and facilitating saturation of a substantial portion of the cleaning disk while the disk is in the jacket, the other side having a perforated portion that may be removed to form an opening for exposing said cleaning disk to a second magnetic head of a flexible disk system.

6. The device of claim 5 wherein said absorbent material is a light color, lint free and fibrous material.

7. The device of claim 5 wherein there is one opening in the first side of the jacket, said opening exposing approximately one-quarter of the surface of said cleaning disk, and wherein said opening formed by removing the perforated portion is in opposed position to said first opening.

8. The device of claim 7 wherein said opening formed by removing the perforation is an elongated thin radial opening.

9. A method for cleaning magnetic heads in a disk system employing a jacket that rotatably supports a cleaning disk within its interior and has a first opening therein and has a perforated portion in opposition to the opening; the steps comprising:
   removing the perforated portion to form a second opening;
   saturating said cleaning disk with a cleaning solution;
   bringing said cleaning disk into contact with said magnetic heads to be cleaned; and
   rotating said cleaning disk to alternately contact said heads with a wet portion and a dry portion of said cleaning disk.

10. A method for cleaning magnetic heads in a disk system employing a jacket that rotatably supports a cleaning disk within its interior and has a first opening therein and has a perforated portion in opposition to the opening; the steps comprising:
   saturating said cleaning disk with a cleaning solution;
   removing the perforated portion to form a second opening;
   bringing said cleaning disk into contact with said magnetic heads to be cleaned; and
   rotating said cleaning disk to alternately contact said heads with a wet portion and a dry portion of said cleaning disk.

* * * * *